Sept. 13, 1938.                L. F. CARTER                2,129,818
                            AIR-BORNE GYROCOMPASS
                          Filed July 31, 1936            3 Sheets-Sheet 2
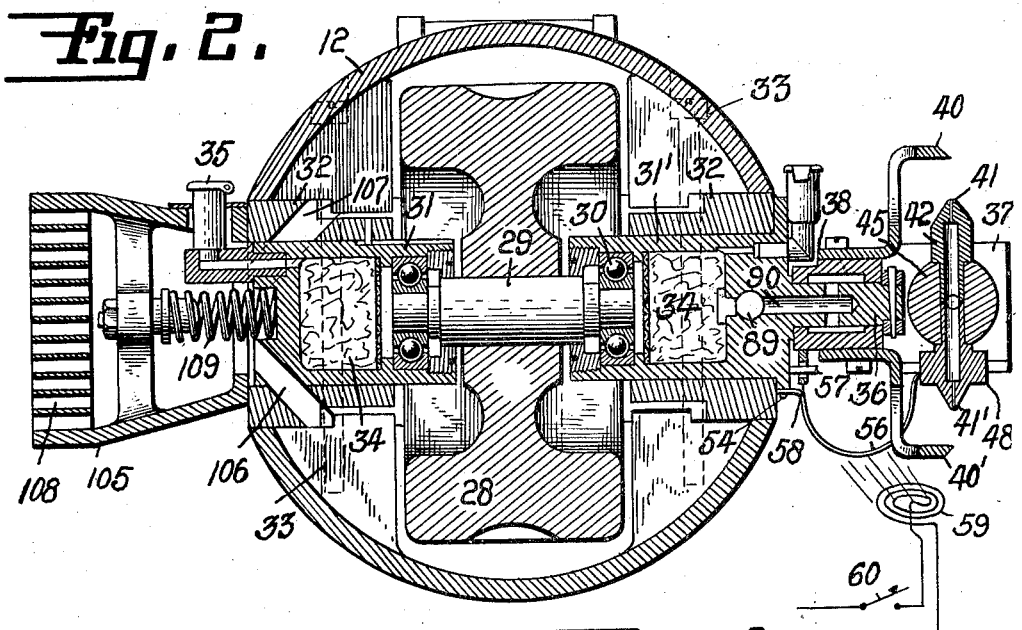
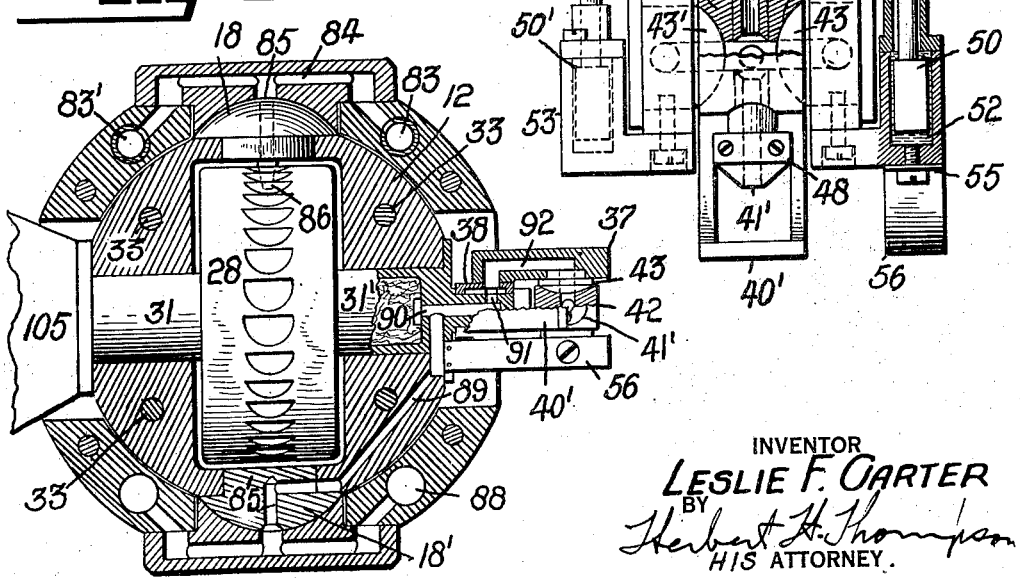
INVENTOR
LESLIE F. CARTER
BY
Herbert H. Thompson
HIS ATTORNEY.

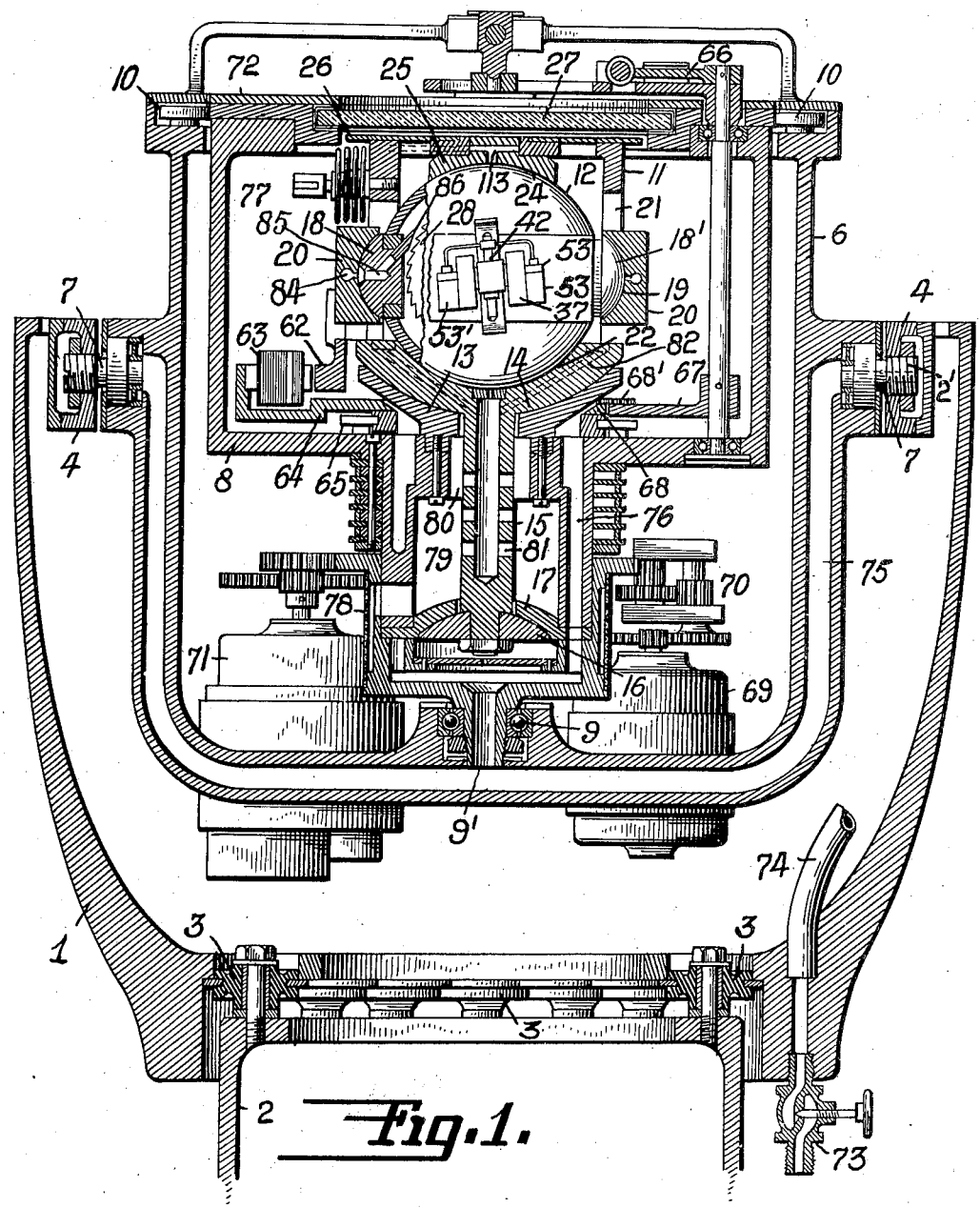

Sept. 13, 1938.                L. F. CARTER                 2,129,818
                           AIR-BORNE GYROCOMPASS
                           Filed July 31, 1936          3 Sheets-Sheet 3

INVENTOR
LESLIE F. CARTER
BY
Herbert H. Thompson
HIS ATTORNEY.

Patented Sept. 13, 1938

2,129,818

UNITED STATES PATENT OFFICE 2,129,818

AIR-BORNE GYROCOMPASS

Leslie F. Carter, Leonia, N. J., assignor to Sperry Gyroscope Company, Inc., Brooklyn, N. Y., a corporation of New York Application July 31, 1936, Serial No. 93,543

14 Claims. (Cl. 33—226)

This invention relates to gyroscopic compasses, especially of the air-borne type wherein air flow films are employed to separate and float adjacent bearing surfaces. Such bearings have the advantage of being the nearest approach to a frictionless bearing yet devised. In my present design, however, I prefer to retain the ordinary anti-friction bearings for the spin axis of the rotor on account of the difficulties experienced in damaging the bearing surfaces of an air rotor bearing when the air supply is shut off, due to the high speed of the rotor and the time taken for it to come to rest after the air is cut off.

Another feature of my design is the mounting of the sensitive element, wherein the mounting axes are kept separate as in the ordinary gyrocompass, instead of being combined in one bearing, as in the true ball type air borne compass.

A further object of my invention is an improvement in the method of applying the gravitational torque to the compass for imparting meridian-seeking properties thereto. According to my present invention, I do not use gravity directly, but use air jets controlled by a small air-borne pendulum for applying this torque. Preferably, also, the torque is applied normally about an axis at a slight angle to the vertical so that damping, as well as meridian-seeking action, is secured. I also provide means for restoring the jet to the true vertical during turning or other acceleration of the ship so as to eliminate damping during that time. For this reason, I provide a novel control device which does not touch the sensitive element and has a minimum of parts. Preferably the small pendulum controlling the air jets is sufficiently damped so as to avoid quadrantal errors.

Referring to the drawings, showing the preferred form of my invention,

Fig. 1 is a vertical section through my new gyroscopic compass.

Fig. 2 is a vertical section, on a larger scale, through the gyroscopic rotor and rotor casing, taken at right angles to Fig. 1.

Fig. 3 is a transverse horizontal section taken through the center of Fig. 2.

Fig. 4 is an end view of the air jet means for applying the gravitational and damping factors.

Figure 5:
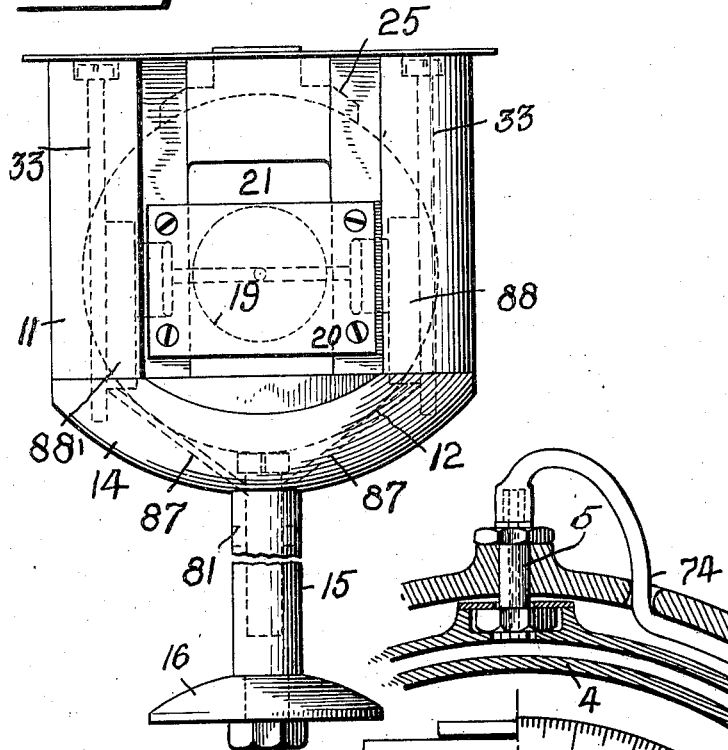
Fig. 5 is a side elevation of the vertical ring of my compass.
Figure 6:
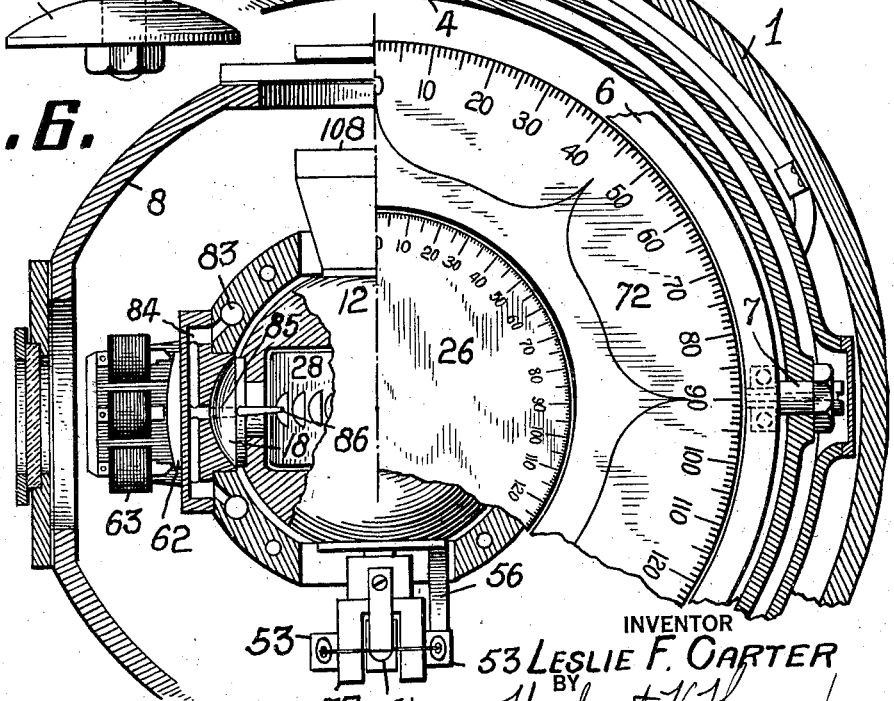
Fig. 6 is a plan view, partly in section, of my compass with the correction device omitted.

My compass is shown as mounted in the usual outer bowl or binnacle 1, but, instead of spring-supporting the compass within the bowl 1 as is usually done, I prefer to spring-support the binnacle itself from the base standard 2. I have shown this bowl as supported from the base 2 on a plurality of rubber mountings 3 of the shock absorbing type, each of which gives a resilient mounting in all directions so that shocks and jars of the ship do not reach the compass. The form of shock mounting I prefer to use is shown in more detail in the co-pending application of Bert G. Carlson, for Anti-vibration mount for airplane instruments, now Patent 2,059,312, Nov. 3, 1936.

Within the bowl 1, the compass proper is universally mounted as by means of a gimbal ring 4 pivoted within the bowl on axis 5—5 which supports, in turn, the main frame or spider 6 of the compass on transverse trunnions 7, 7. Within the frame 6 is journaled, on a vertical axis, the follow-up support 8. This support is shown as journaled at the bottom in an anti-friction thrust bearing 9 and at the top by means of guide rollers 10 around the inner periphery of the frame 6. Within said follow-up support is journaled the sensitive element proper, comprising the vertical ring 11 and the rotor casing 12. The vertical ring is shown as mounted for freedom about a vertical axis on an air bearing comprising a cup member 13 secured to the follow-up support 8 and supporting a spherical shaped button member 14 on the vertical ring, an air flow being supplied between said surfaces to float the latter on the former. A compass card 26 may be mounted directly on the vertical ring, visible through a glass cover 27. To limit the freedom provided by the bearing 13, 14 to freedom about the vertical axis and also to prevent axial displacement, the ring 11 has a downwardly extending stem 15, carrying at its lower end a button 16 forming an air bearing between an inverted cup 17 secured to the frame 8.

The rotor casing 12 is shown as mounted for oscillation about a horizontal axis within the vertical ring 11 by means of horizontally disposed buttons 18, 18', thereon cooperating with cups 19 in transverse members 20 secured across rectangular opening 21 in the vertical ring. Preferably, however, the main weight of the casing 12 is taken by a lower spherical bearing 22, the casing being of spherical shape and resting in a cup formed in the top of the base member 14 of ring 11. Preferably, also, a top spherical bearing 24 is provided between the casing 12 and an inverted cup member 25 on the vertical ring. While the bearings 22 and 24 give a universal mounting for the casing 12, freedom thereof is limited to freedom about an E—W horizontal axis by the buttons and cups 18 and 19, and said buttons and cups also furnish a frictionless connection between the sensitive element and the vertical ring to orient the latter with the former.

Within the casing 12 I journal the rotor 28. The rotor is shown as provided with a stub shaft 29 journaled in anti-friction bearings 30 in the sleeves 31, 31' secured in radial blocks 32 extending within the shell 12, the shell being shown as made in two halves bolted together by set screws 33. Sufficient oil may be placed in the oil reservoirs 34 to lubricate the bearings in service for many months, and additional oil may be supplied through the oil cups 35.

Sleeve 31 is shown as flared at its outer end 105 into which is discharged the exhaust air from casing 12 through channels 106 and 107. To prevent a disturbing torque from said air, grid 108 may be provided to give unidirectional axial flow of exhaust air. Spring 109 is for the purpose of taking up end play in the rotor bearings. The sleeve 31' is shown as having projecting therefrom a stub shaft 36, on which is journaled the hub 38 of a U-shaped support 37. On said support is mounted a pair of knife-edged baffle plates 40, 40' adapted to intercept oppositely directed air streams from small oval or rectangular nozzles 41, 41' at the top and bottom of a small pendulous device 42. Said device is shown as made pendulous by an extra weight 48 at the bottom thereof and is pivotally mounted by means of air bearings for free oscillation about an E—W axis, that is, an axis perpendicular to the spin axis of the rotor in Fig. 2. The said air bearings are shown as provided by inwardly facing buttons 43, 43' in the U-shaped member 37 and cooperating oppositely facing cup members 44 formed in the hub member 45 supporting the end pipe portions 42'. It will readily be apparent, therefore, that, upon relative inclination of the pendulous member 42 and the gyrocompass, the air jets 41, 41' will be differentially intercepted, resulting in a torque about the horizontal axis of the compass to orient it towards the meridian. Preferably, however, I also secure damping by the same air jets by inclining the same at a slight angle to the vertical in the E—W plane (see Fig. 1).

The oscillations of the pendulum are preferably highly damped by small thin paddles 50, 50', secured to cross arms 51, secured to the pendulum 42 and immersed in oil 52 within containers 53 bolted to member 37. It will readily be seen that, as the pendulum tilts in a plane perpendicular to the paper in Fig. 4, the paddles will be displaced, through the oil, to damp the pendulum. In this manner, the oscillations of the pendulum are thrown out of phase with the roll and pitch of the ship so that quadrantal error is avoided in the well-known manner.

As stated above, it is desirable to eliminate the damping during turning or acceleration of the ship. It is for this purpose that the U-shaped block 37 and its supported parts are pivotally mounted on bearing 38, so that the tilt of the block may be eliminated, carrying with it the jets and the baffle plates 40, 40'. This is accomplished in a simple manner by connecting a point 54 on the compass casing with a point 55 attached to block 37 by means of a thermostatic strip 56 (Figs. 2 and 4). When said strip expands, it pushes outwardly in Fig. 2 on block 37, and, since the point of connection 55 thereto is to one side of the axis of hub bearing 38, the block will be rotated slightly about said bearing. The amount of this rotation is limited by a pin 57 secured to the gyro casing and a plate 58 secured to hub 38 and having a slot of limited length therein. For controlling the action of the thermostatic strip, I have shown some form of electric radiant heater 59, such as a hot wire coil or lamp which may be turned off or on by any suitable switch 60, either by hand or automatically, in accordance with the turning and/or change of speed of the ship, as now well understood in the art. See applicant's prior Patent #1,730,967, dated Oct. 8, 1929, for Turning error preventor for gyrocompasses.

The follow-up frame is caused to rotate with the sensitive element by means of any suitable two-part follow-up controller, one part 62 being on the sensitive element and the other part 63 on the follow-up element or a part turnable therewith. Preferably the part 63 is on a member 64 independently mounted within frame 8, as by means of rollers 65, and a correction device 66 is provided for displacing said part 64 slightly with respect to the follow-up frame through sectional gears 67 and 68 and idler 68' as more particularly described and claimed in the co-pending application of Norman W. Thompson, Serial No. 92,951, filed July 28, 1936. The follow-up controller actuates the azimuth motor 69, which turns the follow-up frame through reduction gearing 70. 71 is a transmitter for transmitting the readings of the compass to a distance, and the main compass card, which shows at all times true north, is shown at 72 on top of the follow-up frame.

The air for floating the bearings and preferably also for spinning the wheel and exerting the gravitational and damping torques is preferably supplied from an exhaust pump (not shown) attached to coupling 73 at the base of the bowl 1 and connected to pipe 74 through the hollow trunnion 5, which is connected to the hollow gimbal ring 4 through the hollow trunnions 7 leading within the channel 75 in bowl 6. Said channels connect with a hollow trunnion 9' leading within the frame 8, the air channel passing upwardly, as shown at 76, and into the compartment 77 within frame 8 so that this compartment is continually being exhausted of air. Air at atmospheric pressure enters through the screen 78 at the base of the part 8, passing into the part 79, whence the air branches, part of it passing upwardly through bores 80 to float part 14 in cup 13. Another part of the air passes through openings 81 into the hollow stem 15, whence it passes upwardly, part of the air escaping between the hollow sphere 12 and the cup 22, providing the lower air bearing for the sphere. Other portions of the air pass laterally through channels 82 into vertical channels 83, 83' in the vertical ring, whence the air passes laterally through channels 84 into the bore 85 in the button 18, when the air passes through the spinning jet 86 to spin the rotor. It should be noted that jet 86 tilts with sphere 12 so that no erecting force is exerted thereby to interfere with the main gravitational control. A portion of the air also escapes between the cup 19 and button 18 to provide a frictionless bearing between these parts. Similarly, the air passing through the channels 87 passes upwardly through vertical bores 88 in the vertical ring and into the button 18', a portion of the air escaping between the button and cup to float the same. Air also passes through bore 85' (Fig. 3) and into channel 89 within the casing 12, whence it enters an axial bore 90 in the stub shaft 36. The air thence passes outwardly through radial openings 91 into channels 92 in block 37, whence the air passes laterally through buttons 43, floating member 42, and thence into the pendulum member 42, whence the air passes upwardly and downwardly through the pipe and out the oval or rectangular slots 41, 41'. Air is also supplied between the upper cup 25 and sphere 12 through a channel 113 in the vertical ring 11 (not shown) connected with one of bores 88 and discharging air between the cup and sphere.

It should be noted that, in my new compass, all shocks and jars from the ship are prevented from reaching the sensitive element. Not only is the sensitive element air borne around all three axes, but the main binnacle 1 is shock-mounted on the standard 2, secured to the ship's deck. Experience has shown that better results are obtained by shock-mounting a heavy part than a light part. Therefore, by placing the shock-mounting between the binnacle and the standard, better results are obtained than by trying to spring-mount the part 6 within the gimbal ring, or spring-mount the gimbals within the bowl 1. In addition, it is difficult to obtain a spring mounting which will absorb transverse as well as vertical shocks.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an air borne gyro-compass, a hollow spherical member forming the rotor bearing casing, a rotor journaled therein, a vertical ring, an air borne spherical bearing under said member and between it and the vertical ring for universally supporting the weight of said member, additional E—W horizontal air bearings coupling said ring and member for movement in unison about the vertical axis, and air borne thrust bearings for supporting said ring for freedom about said vertical axis.

2. In an air borne gyro-compass, a hollow spherical member forming the rotor bearing casing, a rotor journaled therein, a vertical ring, an air borne spherical bearing under said member and between it and the vertical ring for universally supporting the weight of said member, additional E—W horizontal air bearings coupling said ring and member for movement in unison about the vertical axis, a follow-up support enclosing all parts named, air borne thrust bearings for supporting said ring for freedom about a vertical axis in said support, means whereby said support may be exhausted of air, and means for leading atmospheric air into said bearings.

3. In an air borne, air spun gyro-compass, a closed follow-up support but having an air intake, means whereby the support may be continuously exhausted of air, a sensitive element within said support, air borne bearings providing freedom about the vertical axis and an E—W horizontal axis, an air nozzle for spinning the rotor, and channels leading air from said intake to each of said bearings and said nozzle to float said element on air bearings and to spin the rotor.

4. In a gyro-compass, the combination with a gyroscope, means for mounting the same for turning about a vertical axis and in neutral equilibrium for oscillation about a horizontal axis, a gravitationally restrained device connected thereto, a source of power, means brought into action upon relative tilt of said device with respect to said gyroscope for causing said source of power to directly apply a single torque on said gyroscope about an inclined axis whereby both damping and meridian seeking properties are obtained, and means for eliminating the inclination of said inclined axis during turning of the ship, whereby only that component of said torque about the vertical axis is eliminated.

5. In a gyro-compass including a gyrocasing and a gyro rotor mounted for rotation therein, means for mounting said casing for turning about a vertical axis and oscillation about a horizontal axis, a gravitationally responsive device pivoted on said casing and having upwardly and downwardly directed air jets and a baffle member secured to said casing differentially intercepting said jets on relative tilt of said casing and device, and damping means for said device.

6. In an enclosed gyro-compass, a single source of power for exerting a torque on the gyroscope upon tilt thereof, said torque being about both a horizontal axis for meridian seeking purposes and about a vertical axis for damping purposes, a thermostatic strip for eliminating the vertical axis component of said torque upon increase in temperature above normal, and means for directing radiant energy on said strip when the ship turns, to temporarily eliminate the damping during turning of the ship.

7. In a gyro-compass having a damping device, means for rendering said device inoperative during turning, including a thermostatic element and means for turning on a source of electrical energy adjacent thereto for causing said element to render said device inoperative when said source is on.

8. In an air borne gyroscopic compass, a gyro-rotor, a substantially spherical rotor bearing casing therefor, a vertical ring, a spherical air bearing at the bottom of said casing for universally supporting the same within said ring, and additional air bearings between said vertical ring and casing along the E—W axis.

9. In an air borne gyro-compass, a hollow spherical member forming the rotor bearing casing, a rotor journaled therein, an air jet within and which tilts with said member for spinning said rotor, a vertical ring, an air borne spherical bearing under said member and between said member and the vertical ring for universally supporting the weight of said member, additional E—W horizontal air bearings coupling said ring and member for movement in unison about the vertical axis, air borne thrust bearings for supporting said ring for freedom about said vertical axis, and means for leading air through each of said air bearings to supply air to said spinning jet and air float the gyroscope.

10. In a gyro-compass including a gyrocasing and a gyrorotor mounted for rotation therein, means for mounting said casing for turning about a vertical axis and oscillation about a horizontal axis, a gravitationally responsive device on said casing and having upwardly and downwardly directed air jets, spherical air bearings pivoting said device on said casing and through which the air for said jets passes, a baffle member secured to said casing differentially intercepting jets on relative tilt of said casing and device, and means for giving said device a long period of oscillation.

11. In a gyro-compass having a damping device, means for rendering said device inoperative during turning, including a thermostatic element, an electric heating device adjacent thereto, and means for passing an operating current through said heating device for causing said element to render said damping device inoperative on turning of the ship.

12. In a gyro-compass including a gyrocasing and a gyrorotor mounted for rotation therein, means for mounting said casing for turning about a vertical axis and oscillation about a horizontal axis, a gravitationally responsive device on said casing and having generally upwardly and downwardly directed air jets, said jets being normally slightly inclined in the E—W plane, spherical air bearings pivoting said device on said casing for freedom in the N—S plane and through which the air for said jets passes, and a baffle member secured to said casing differentially intercepting said jets on relative tilt of said casing and device in the N—S plane.

13. In a gravitationally controlled gyroscopic apparatus for moving vehicles, a free gyroscope, a gravitationally responsive element thereon, means controlled by the relative inclination of said element and gyroscope for exerting corrective torques thereon in one direction or the other, and means for rendering said corrective torques ineffectual during turning, including a thermostatic element and means for turning on and off a source of electric energy adjacent thereto for rendering said torque means effective except when turning.

14. In a gravitationally controlled gyroscopic apparatus, a free gyroscope, a gravitationally responsive element thereon, means controlled by the relative inclination of said element and gyroscope for exerting corrective torques thereon in one direction or the other, and means for rendering said corrective torques ineffectual during turning, including a thermostatic element connecting said gyroscope and gravitational element and means for heating the same to relatively displace said element and gyroscope to render the corrective means inoperative on turns.

LESLIE F. CARTER.